United States Patent [19]
Collignon et al.

[11] Patent Number: 4,793,445
[45] Date of Patent: Dec. 27, 1988

[54] CASTER BRAKE ASSEMBLY

[75] Inventors: Herbert E. Collignon; Dennis W. Hollis, both of Evansville, Ind.

[73] Assignee: Babcock Industries, Inc., Evansville, Ind.

[21] Appl. No.: 104,816

[22] Filed: Oct. 5, 1987

[51] Int. Cl.⁴ .............................................. B60T 3/00
[52] U.S. Cl. .................................... 188/29; 188/1.12; 188/19; 188/57
[58] Field of Search ................... 188/29, 1.12, 57, 20, 188/9, 10, 19; 16/35 D, 35 R

[56] References Cited

U.S. PATENT DOCUMENTS

| | | | |
|---|---|---|---|
| 2,709,828 | 6/1955 | Noelting et al. | 188/1.12 |
| 3,057,638 | 10/1962 | Floyd | 188/1.12 |
| 3,159,865 | 12/1964 | Shepherd | 188/1.12 |
| 3,388,419 | 6/1968 | Crawford | 188/1.12 |
| 3,534,978 | 10/1970 | Stanfield | 188/1.12 |
| 3,636,725 | 1/1971 | Lorrance | 188/1.12 |
| 3,800,916 | 4/1974 | Kjellberg et al. | 188/1.12 |
| 3,942,608 | 3/1976 | Frank et al. | 188/1.12 |
| 4,248,445 | 2/1981 | Vassar | 280/79.1 R |
| 4,349,937 | 9/1982 | Fontana | 16/35 R |
| 4,360,951 | 11/1982 | Bucher | 16/35 R |
| 4,385,414 | 5/1983 | Damico | 188/1.12 |
| 4,526,253 | 7/1985 | Schmidt | 188/1.12 |

FOREIGN PATENT DOCUMENTS

| | | | |
|---|---|---|---|
| 1198211 | 8/1965 | Fed. Rep. of Germany | 188/1.12 |
| 0537196 | 6/1941 | United Kingdom | 188/20 |

Primary Examiner—Andres Kashnikow
Assistant Examiner—Mark T. Le
Attorney, Agent, or Firm—Woodard, Emhardt, Naughton, Moriarty & McNett

[57] ABSTRACT

A caster brake assembly simultaneously brakes separate caster wheels, one swiveling and one non-swiveling, of a movable caster-wheel supported article. It includes a bracket mounted to the bottom of the article, a longitudingal frame assembly vertically slidably mounted to the bracket, brake shoes mounted at the ends of the frame assembly, and a cam member pivotably mounted to the frame assembly and operable against the bracket to force the frame assembly downward relative to the bracket and to brakingly engage the brake shoes against the wheels.

15 Claims, 3 Drawing Sheets

CASTER BRAKE ASSEMBLY

FIELD OF THE INVENTION

The present invention relates to the field of caster brakes and in particular to a single acting brake assembly for simultaneously braking two separately pinioned caster wheels.

BACKGROUND OF THE INVENTION

Floor-supported, movable articles such as cabinets, carts and tables are widely used in industry and business such as by offices, airlines, restaurants and factories. Many such movable articles include four wheels to facilitate movement, with at least two of them being swiveling caster wheels to permit the article to be turned without lifting it or sliding some of the wheels sideways. It is generally known in the prior art to provide locking means for locking caster wheels both from turning and from swiveling. However, many of the locking means of the prior art do not perform well in certain situations.

In many instances, space requirements will require compact wheels and braking mechanisms, and may require a braking mechanism capable of being operated by one person from a position on one side of the cart remote from the side having the wheels which should be braked. In instances where space is not such a concern, a heavy or large movable article should be manageable by one person, which calls for an easy to operate, remote brake mechanism.

Some devices, such as those disclosed in U.S. Pat. Nos. 3,942,608, 3,388,419 and 2,709,828, brake only one swiveling caster wheel at a time, with the actuating lever swiveling with the wheel, often making access to the lever inconvenient. Some devices, such as those disclosed in U.S. Pat. Nos. 4,385,414, 4,248,445, 3,363,725, 3,159,865 and 3,057,638, are designed to brake several wheels at a time by having a central housing and operating along the vertical support of each wheel. Each involves complicated linkages, however, which requires special construction of the article above the location where the caster is located, so they are not easily adaptable to a variety of types of movable articles. U.S. Pat. Nos. 4,526,253 and 4,360,951 disclose devices which brake several wheels at a time. U.S. Pat. Nos. 3,534,987 discloses a simple, bottom-mounted caster brake assembly. However, this device brakes only one wheel at a time.

Heretofore, what was needed was a simple braking mechanism which would simultaneously brake both wheels which should be braked, whether they be fixed, swiveling or a combination of the two, which will apply substantially equal braking force to each wheel and which will do so from a location on the article remote from the wheels to be braked.

SUMMARY OF THE INVENTION

Generally speaking, there is provided a single acting caster brake assembly which simultaneously brakes two separate caster assemblies of a moveable caster wheeled article. According to one embodiment, a caster brake assembly has a bracket mounted between the wheels to be braked. A longitudinal frame assembly, having wheel engaging brake shoes, extends between the wheels and is slidably mounted to the bracket for vertical movement in relation thereto. A cam member is pivotally mounted between the bracket and the frame assembly. Pivoting of the cam member moves the frame assembly relative to the bracket, which engages the brake shoes against the wheels.

It is an object of the present invention to provide a caster brake assembly which will brake two wheels simultaneously.

It is another object of the present invention to provide a caster brake assembly which is compact and easily adaptable to existing movable articles.

It is a further object of the present invention to provide a caster brake assembly which can easily be operated from the side of the article opposite the side at which the wheels are to be braked.

Further objects and advantages of the present invention will be apparent from the following description.

DESCRIPTION OF THE PREFERRED EMBODIMENTS

Figure 1:
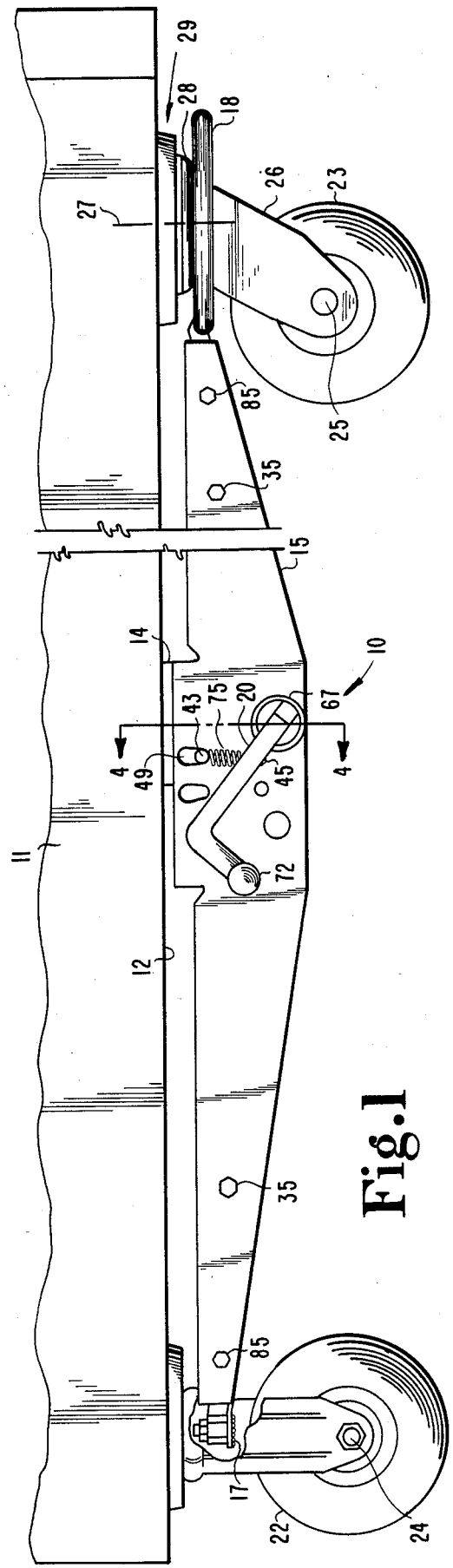
FIG. 1 is a front elevational view of a caster brake assembly on a movable cabinet in accordance with one embodiment of the present invention, the brake being in the rest position with a portion being broken out to conserve space in the drawing.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is designed primarily for use with movable tool storage chests, generally referred to hereinafter as "cabinets," and is illustrated and described herein as applied to such a cabinet. However, the invention may be equally applicable to any other vehicular structure mounted on ground-engaging wheels such as carts, tables, beds, machines and the like.

Referring now to FIG. 1, there is shown a caster brake assembly 10 in use with a conventional movable storage cabinet 11 in accordance with one embodiment of the present invention. Brake assembly 10 is mounted for engagement with and between a fixed (i.e., non-swiveling) caster wheel 22 and a swiveling caster wheel 23. Caster wheel 22 rotates about horizontal axis 24 which is fixed relative to storage cabinet 11. A conventional swiveling caster wheel 23 rotates about axis 25 which is located by a pair of parallel yoke arms 26 (one shown) of the caster horn which is welded or otherwise affixed to the swivel bearing race 28 of the ball bearing swivel assembly 29 which is mounted to bottom 12 of storage cabinet 11 in a conventional manner, so caster wheel 23 can swivel about vertical swivel axis 27.

Brake assembly 10 includes mounting bracket 14 fixedly secured to bottom 12 of storage cabinet 11, frame assembly 15 slidably mounted to bracket 14, a metal brake shoe pad 17, a spring steel brake shoe ring 18, and actuating lever 20. Generally speaking, brake assembly 10 includes two positions, a rest position and a locked braking position. In the rest position (FIG. 1), brake shoes 17 and 18 are positioned vertically above and away from wheels 22 and 23 with frame assembly 15 vertically upward relative to bracket 14. In the barking position (FIG. 2), frame assembly 15 is positioned vertically downward relative to bracket 14 with brake shoes 17 and 18 brakingly biased against the tread of wheels 22 and 23, respectively.

Figure 2:
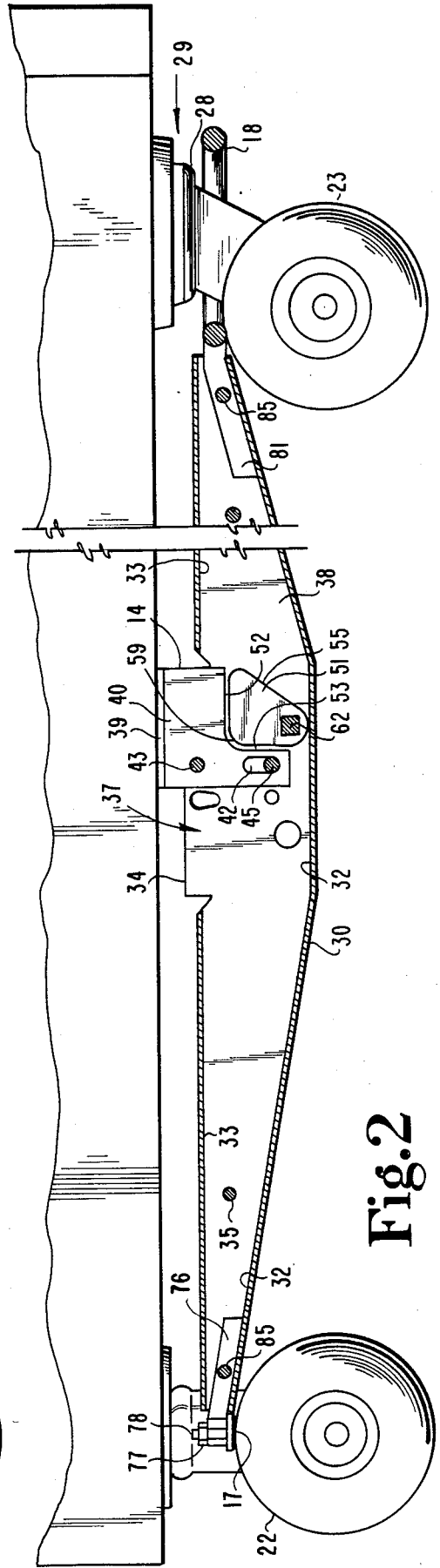
FIG. 2 is a front sectional view of the caster brake assembly shown in FIG. 1, but with the brake assembly in the locked position, with a portion being broken out to conserve space as in FIG. 1.
Figure 3:
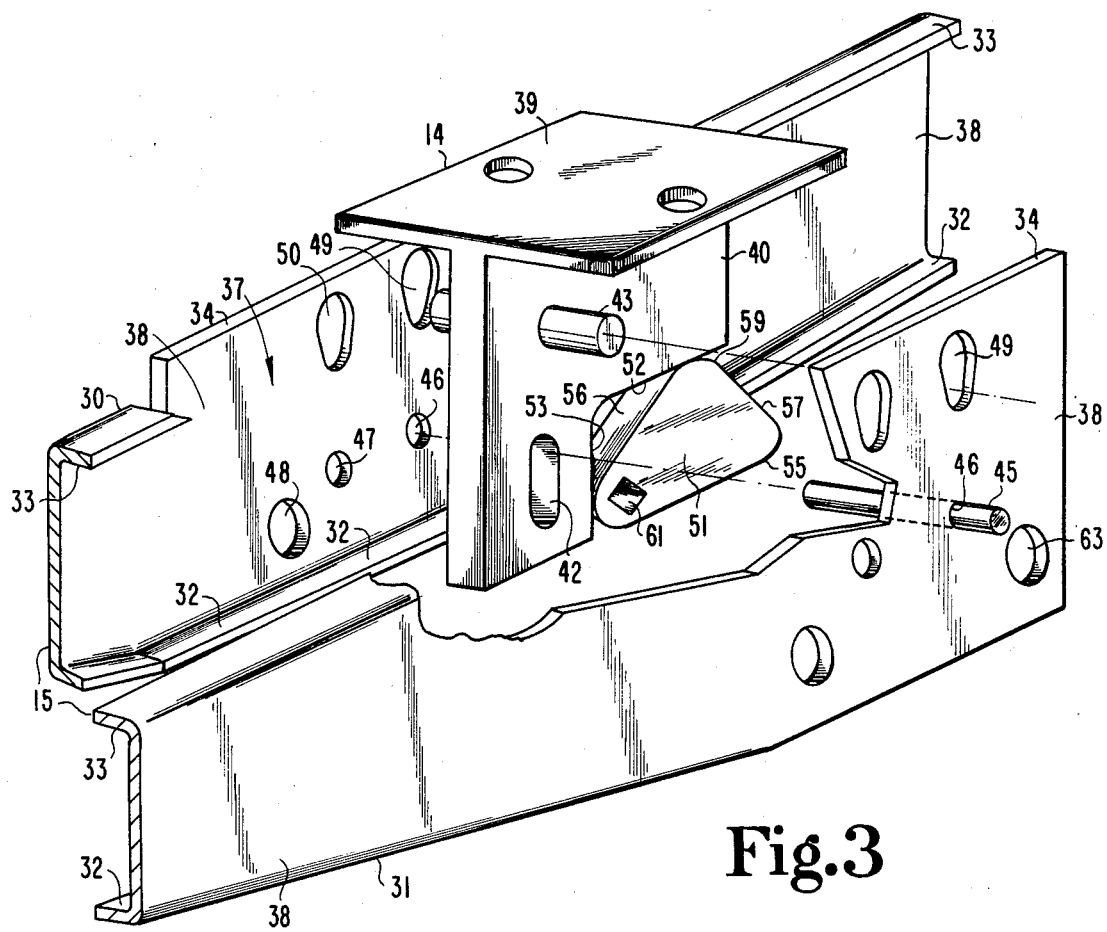
FIG. 3 is an exploded perspective view of the central portion of the caster brake assembly of FIG. 1 showing the bracket, cam member and frame assembly in the rest position.

Referring now generally to FIGS. 2 and 3, frame assembly 15 is comprised of a pair of mating and identically opposite shells 30 and 31, each made of a strong and lightweight material such as stamped metal. Each shell 30 and 31 includes horizontal and inwardly extending, upper and lower longitudinal mating flanges 33 and 32 at the upper and lower margins of vertical wall 38. At the middle of each shell, upper flange 33 is interrupted and wall 38 continues upwardly forming vertical guide flange 34. Each shell 30 and 31 is tapered from the middle to the ends. When shells 30 and 31 are brought together, mating flanges 32 and 33 of shell 30 abut and are welded to mating flanges 32 and 33 of the other shell 31, forming continuous welded joints therebetween. The two shells are thereby held tightly together. Pins or dowels at holes 35 (FIG. 1) can be used to assist in assembly.

The above described configuration of each shell 30 and 31 is such that, when the shells are brought together, a central, upwardly opening cavity 37 is defined between the shells by wall sections 38 and vertical guide flanges 34. Cavity 37 slidably receives T-shaped bracket 14, which has a flat upper mounting portion 39 securely mounted to the bottom 12 of cabinet 11 by welding or appropriate fasteners, such as screws. Bracket 14 has a downwardly extending guide portion 40 with a vertically extending slot 42 through it. Horizontal pin 43 is fixed to guide portion 40 and extends upwardly on both sides of it.

Cross pin 45 is tightly fitted in holes 46 in walls 38 of the two shells and extends across cavity 37 and through vertically extending slot 42 in guide portion 40. Wall 38 of each shell 30 and 31 includes a downwardly tapering slot 49 receiving therethrough an end of pin 43. The relationship between the slots and pins is such that, with brake assembly 10 in the rest position, pin 43 is aligned to pass through at the bottom of each slot 49 and pin 45 is aligned to pass through at the top of slot 42.

Figure 4:
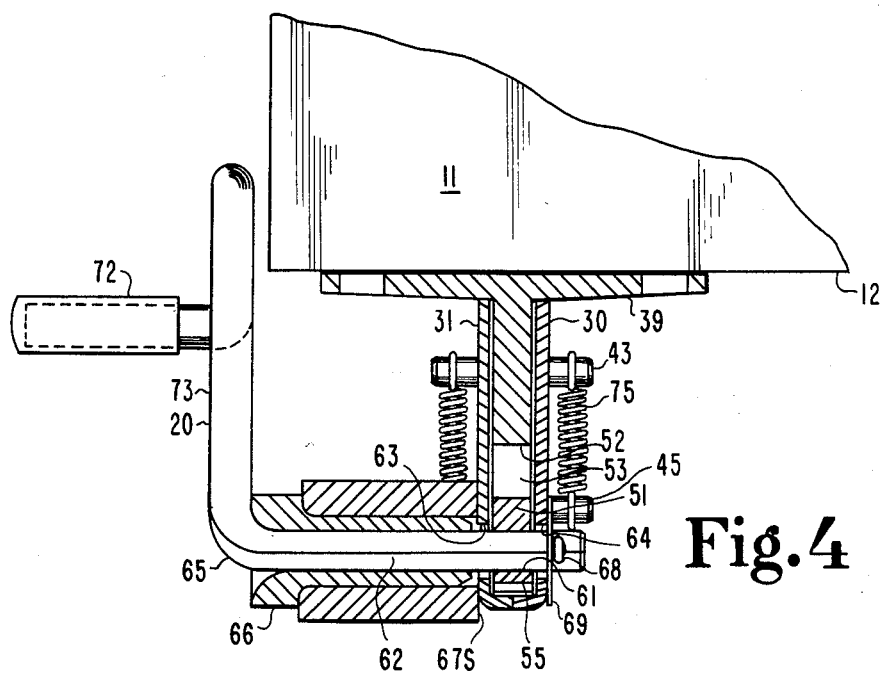
FIG. 4 is a partial cross-section view of the central portion of the caster brake assembly of FIG. 1 taken along the lines 4—4.

Referring now to FIGS. 3 and 4, engagement of the brake assembly is achieved through cam action of a triangularly shaped cam member 51 which is pivotally mounted to and between walls 38 within cavity 37. A large notch 52-53 in the lower corner of mounting bracket guide portion 40 provides downwardly facing horizontal cam surface 52 and vertical stop surface 53. Cam member 51 closely approximates a right triangle, with hypotenuse side 55 lying substantially horizontally in the rest position, as shown in FIG. 3. The two short legs of the triangle comprise stop side 56 and locking side 57. The right angle corner between stop side 56 and locking side 57 is rounded to form cam face 59. A square hole 61 through cam member 51 is provided at the corner between hypotenuse side 55 and stop side 56, and which receives actuating lever shaft 62 therethrough. Shaft 62 has square cross-section and fits square hole 61.

A shaft support bearing sleeve 67 has its inner end 67S (FIG. 4) welded or otherwise fixed to shell 31. It rotatably receives and supports bushing 66 which has a square hole therethrough which fittingly receives shaft 62. Shaft 62 extends through clearance holes 63 and 64 in shells 31 and 30, respectively. The distal end of shaft 62 is retained in place outside shell 30 by an appropriate retainer such as cotter pin 68 and washer 69. Lever 20 is actuated by foot pedal or handle 72 which is mounted to arm 73 extending from shaft 62 at the right angle bend 65.

As mentioned above, shells 30 and 31 are designed to be interchangeable, thus a dual set of holes and slots are provided with only one set being used per shell. Thus, as shown in FIG. 3, if shell 30 were inverted and compared to shell 31, hole 47, hole 48 and slot 50 of shell 30 would be the same as hole 46, hole 63 and slot 49 of shell 31.

Pin 43 may be connected to guide portion 40 and pin 45 may be connected at hole 46 of wall 38 of either shell 30 or 31 by any appropriate means such as press fit or welding, for example.

Pins 43 and 45 are long enough to extend outside of shells 30 and 31, as shown in FIG. 4. Frame assembly 15 is biased to the rest position by a pair of coil springs 75 which extend in tension between the outwardly extending portions of pins 43 and 45 to which the end loops of the springs are snugly mounted. (FIGS. 1 and 4).

Brake shoe 17 for fixed caster wheel 22 is held by bar 76 which is fixed to frame assembly 15 by an appropriate fastener assembly 85 such as bolt, washer and locknut. Brake shoe 17 may have a vertical, threaded stem 78 threaded into the end of bar 76, whereby the shoe is vertically adjustable, and can be locked by nut 77. Brake shoe 18 is liekwise held by jam bar 81 which is rigidly connected to frame assembly 15 by an appropriate fastener assembly 85 such as a bolt, washer and locknut. Brake shoe 18 is a loop or ring which encircles horn 26 and rests below bottom 12 of storage cabinet 11 and above wheel 23. Brake shoe 18 is substantially concentric with swivel axis 27 and has an inner diameter great enough to permit complete swiveling revolution of horn 26 so that contact is limited to braking engagement between brake shoe 18 and wheel 23.

In view of the above-described configuration, caster brake assembly 10 operates as follows:

With brake assembly 10 in the rest position as shown in FIGS. 1, 3 and 4, springs 75 hold frame assembly upward relative to bracket 14, with the upper edges of flanges 34 abuttingly engaging the bottom faces of mounting portion 39 of bracket 14. Brake shoes 17 and 18 are riding just above wheels 22 and 23, respectively. To engage brake assembly 10, foot pedal 72 is depressed causing actuating lever 20 to rotate counterclockwise about the axis of shaft 62. The square shaft 62 fitting in the square hole 61 of cam member 51 causes cam member 51 to rotate counterclockwise to the locked position as shown in FIG. 2. During the counterclockwise turning, cam face 59 moves along and pushes upward against horizontal cam surface 52 of bracket 14. But bracket 14 does not move upwards, so cam member 51 and shaft 62, and thereby frame assembly 15 are forced downward relative to bracket 14, which engages brake shoes 17 and 18 against wheels 22 and 23. The relative placement of pins 43 and 45 and slots 49 and 42, and the clearance and shape of the slots, permit slight rocking or tilting of frame assembly 15 relative to shoe 17 which, as mentioned above, can be vertically adjusted to result in the desired amout of braking force applied between the brake shoes and wheels when cam member 51 has been rotated approximately 45 degrees counter-clockwise as shown in FIG. 2. At this point, stop side 56 meets vertical stop surface 53, thus limiting further rotation of actuating lever 20.

As slots 42 and 49 are vertical, frame assembly 15 may only move vertically relative to bracket 14. Thus, when the vertical axis of the brake shoes are equidistant from lever shaft 62, as is intended, brake shoes 17 and 18 will move in unison vertically to engage and brake wheels 22 and 23, substantially simultaneously and with equal or balanced force. In case the brake shoes, wheels or both would wear or become irregular enough to cause asymmetrical application of the brake shoes, shoe 17 can be vertically adjusted in bar 76 by screw 78 and nut 77. To accommodate this adjustment for wear, upper slots 49 are widened slightly at their upper end to permit a small degree of skew or tilt for frame assembly 15 as mentioned above. So it is seen that, when the brake is applied, the frame assembly has been transferred from a beam suspended from its center (pin 45), to a beam supported at its ends by brake shoes 17 and 18 and loaded at its center by cam shaft 62. If the nature of braking ability of pad and ring against the treads of the non-swiveling and swiveling caster, respectively, were such that higher vertical force was needed on one compared to the other, the manufacture of the assembly could be such that the location of the bracket lengthwise of the beam would place the cam at an appropriate distance to obtain the desired moment arm to each brake shoe.

Figure 6A:
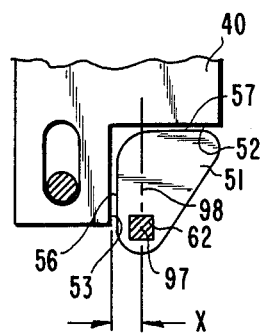
FIGS. 6A and 6B are diagrammatic side views of the cam assembly of the caster brake assembly of FIG. 1.
Figure 6B:
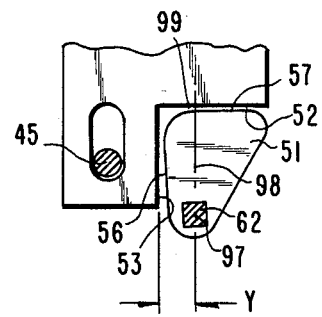

Referring to FIGS. 6A and 6B, engagement of caster brake assembly 10 could be made locking or non-locking, depending on the configuration and placement of cam member 51 relative to cam surface 52 and stop surface 53. In FIG. 6A, the angle between stop side 56 and locking side 57 is greater than or equal to 90°, and the horizontal distance X between horizontal axis 97 of shaft 62 and vertical stop surface 53 is at the minimum permitted by the structures. In this case, when cam member 51 is pivoted against guide portion 40, stop side 56 hits stop surface 53, but no part of locking side 57 to the left of a line 98 perpendicular to cam surface 52. and passing through axis 97 touches cam surface 52. Thus, spring forces pulling shaft 62 and cam member 51 up against cam surface 52 create on cam 51 only a clockwise moment about horizontal axis 97 which urges disengagement of the brake assembly. This is not desired.

In FIG. 6B, the angle between stop side 56 and locking side 57 is less than 90° and the horizontal distance Y between horizontal axis 97 of shaft 62 and vertical stop surface 53 is great enough to permit a portion 99 of locking side 57 to contact cam surface to the left of perpendicular line 98. The spring forces pulling cam member 51 up against cam surface 52 create equal moments about horizontal axis 97 resulting in a stable, locked position for cam member 51. Cam member 51 can be disengaged by applying minimal upward force to pedal 72, causing a clockwise moment to lever 20 and shaft 62 and, thereby to cam 51.

Figure 5:
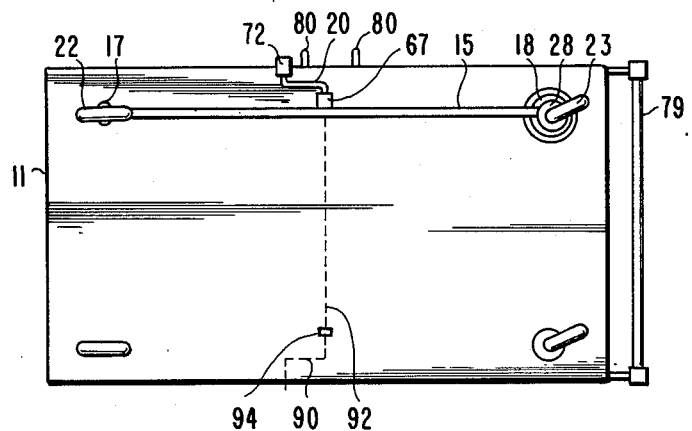
FIG. 5 is a bottom view of a caster wheeled tool box with the caster brake assembly in FIG. 1 mounted thereon.

In the present embodiment, as shown in FIGS. 4 and the bottom view of FIG. 5, the brake assembly is mounted near the front of a mechanic's tool cabinet 11, the front being where the cabinet doors (with pull handles 80) and the tool drawer handles (not shown) are located. The non-swiveling casters are near the left end. The swiveling casters are near the right end. This makes it convenient for the mechanic to push the cabinet from right to left, using the push bar 79. When it has been pushed to the location where the mechanic will be using it, he steps around to the front and pushes down with his foot on pedal 72, to lock the shoes on casters 22 and 23. Then he has convenient access to the cabinet doors and the drawers above.

On some articles, it may be desirable or necessary to mount the brake assembly at one side of the storage cabinet and operate it from the other. The configuration of our brake assembly permits actuating lever 20 to be mounted from either side of frame assembly 15, depending only on mounting the sleeve 67 on the outboard shell. Simply by substituting for lever 20, an extension lever 90 (dotted line in FIG. 5) having a much longer shaft 92, the brake assembly may be engaged from the side of cabinet 11 opposite its mounting. An appropriate support bushing 94 can be provided for shaft 92 near lever 90.

Brake shoe mounting bars 76 and 81 (FIG. 2) mount in the opposite ends of frame assembly 15 in identical manner. Thus, in other embodiments, the caster brake assembly may be used where both wheels to be braked are non-swiveling or are swiveling. In this case both brake shoes would be like that shown at 17 or 18, respectively.

In other embodiments, two sets of caster brake assemblies 10, one between each pair of wheels, could be provided, with a single actuating lever operating both. In this case an extended shaft such as the one shown at 92 in FIG. 5 would extend through the shaft clearance holes 63 of two caster brake assemblies.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A caster brake assembly for simultaneously braking ground engaging caster wheels separately mounted on a vehicle, comprising:
   a bracket rigidly mounted to the vehicle between the wheels and having a first downwardly extending plate;
   a longitudinal frame assembly extending between the wheels and being slidably mounted to the plate for planar motion parallel to the plate;
   brake shoes rigidly attached at ends of said frame assembly;
   guide means, connected to said frame assembly and said bracket, for guiding the movement of said frame assembly along only one linear direction relative to said bracket;
   a cam member pivotably mounted to one of said frame assembly and said bracket such that pivoting of said cam member against the other of said frame assembly and said bracket causes said frame assembly to move relative to said bracket and causes said brake shoes to simultaneously engage both wheels; and, spring means, mounted between said bracket and said frame assembly, for urging said frame assembly and said brake shoes away from the wheels;

said frame assembly including a pair of opposing parallel walls defining a cavity for sliding receipt of the plate therebetween and wherein said cam member is pivotally mounted to said frame assembly within said cavity for cam engagement against said bracket.

2. The assembly of claim 1 further including an actuator extending through said frame assembly and being rigidly attached to said cam member for pivotal actuation thereof.

3. The assembly of claim 1 wherein said guide means includes at least two combinations, each combination including a horizontal pin and vertical slot means for slidably receiving the pin, each vertical slot means being defined in one of the plate and the opposing parallel walls, and the pin being mounted to the other of the plate and the opposing parallel walls and being received within the vertical slot means, the vertical slot means being all mutually parallel.

4. The assembly of claim 3 wherein one pin of one of said at least two combinations is rigidly fixed to the plate and extends outwardly through the slot means in the opposing parallel walls and wherein another pin of another of said at least two combinations is rigidly fixed to the opposing parallel walls and extends outwardly therefrom and wherein said spring means includes a tension spring extending between said one pin and said another pin.

5. The assembly of claim 3 wherein one of the ground engaging caster wheels is mounted to the vehicle for rotation about a non-moving axis and the other of the ground engaging caster wheels is swivel mounted to the vehicle for rotation about a swiveling axis and wherein one of the brake shoes is a ring suspended for engagement with the swivel mounted caster wheel.

6. The assembly of claim 3 wherein there are one additional non-swiveling caster wheel and one additional swivel mounted caster wheel mounted to the vehicle.

7. The assembly of claim 3 and including an actuator secured to said cam member and having a handle under the vehicle and accessible to a foot for operating the cam member to engage the brake shoes with the first-mentioned wheels.

8. A caster brake assembly for use upon separately located caster wheels mounted to a furniture structure, comprising;

a mounting bracket rigidly mounted to the furniture structure between the wheels, said mounting bracket having a cam engaging follower surface;

a frame assembly slidably mounted to said mounting bracket and extending between the wheels;

first and second brake shoes connected to said frame assembly, for engaging with the wheels;

a cam member pivotally mounted to said frame assembly;

actuator means for pivoting said cam member against the follower surface from a first position wherein said cam member is in a rest position relative to the follower surface and wherein said brake shoes are in a rest position away from the caster wheels, to a second position wherein said cam is pivoted against the follower surface, whereby said frame assembly is slidably shifted relative to said mounting bracket and said brake shoes are brakingly engaged with the caster wheels; and spring means for biasing the brake shoes to the rest position.

9. The assembly of claim 8 further including guide means integral to said mounting bracket and said frame assembly for ensuring substantially simultaneous engagement of said brake shoes against the wheels.

10. The assembly of claim 9 wherein said mounting bracket includes a downwardly extending plate which slidably extends into a cavity within said frame assembly and wherein said guide means includes a first pin, rigidly connected to the plate and extending outwardly through vertically extending slots in said frame assembly, and a second pin, rigidly connect to the frame assembly and extending through a vertically extending slot in the plate.

11. The assembly of claim 9 wherein one of the wheels is swivel mounted to the furniture structure and one of said first and second brake shoes is a ring suspended below the furniture structure and above the swivel mounted wheel for engagement with the swivel mounted wheel.

12. A brake device for use in braking two independently located caster wheel assemblies of a wheeled cart, comprising:

a downwardly extending bracket mounted to the cart, said bracket having a downwardly facing cam engageable surface;

a frame extending between the wheels, said frame including a cavity having walls and slidably receiving said bracket therein, said frame also having first and second ends;

a cam member pivotally mounted to the frame and located between the walls, said cam member disposed to pivot against the cam engageable surface;

first and second brake shoes mounted to the first and second ends of said frame; and an actuator connected to said cam and operable to force said cam against said cam engaging surface for pushing said frame downward relative to said bracket and engaging said first and second brake shoes against the wheels.

13. The braking device of claim 12 further including guide means for guiding said frame substantially vertically so that said first and second brake shoes are applied against the wheels substantially simultaneously.

14. The braking device of claim 13 wherein said guide means includes a pair of vertical slots horizontally aligned in the walls of said cavity and a horizontal pin rigidly connected to said bracket and extending outwardly from both sides of said bracket through the slots, and further including a central vertical slot in said bracket and a second horizontal pin extending completely through the central bracket and rigidly connected to at least one of the walls of said cavity.

15. The braking device of claim 14 further including spring means connected to and between the first horizontal pin and the second horizontal pin for biasing said frame and said first and second brake shoes upward and away from the wheels.

* * * * *